US008707301B2

(12) United States Patent
Fries

(10) Patent No.: US 8,707,301 B2
(45) Date of Patent: Apr. 22, 2014

(54) INSERTION OF MANAGEMENT AGENTS DURING MACHINE DEPLOYMENT

(75) Inventor: Robert M. Fries, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 268 days.

(21) Appl. No.: 12/941,898

(22) Filed: Nov. 8, 2010

(65) Prior Publication Data

US 2012/0117212 A1   May 10, 2012

(51) Int. Cl.
G06F 9/455 (2006.01)
G06F 15/177 (2006.01)
G06F 9/44 (2006.01)
G06F 9/445 (2006.01)
H04L 12/24 (2006.01)

(52) U.S. Cl.
CPC .......... G06F 9/45533 (2013.01); G06F 8/60 (2013.01); G06F 8/71 (2013.01); H04L 41/046 (2013.01)
USPC ............ 718/1; 709/220; 709/223; 717/121; 717/176

(58) Field of Classification Search
None
See application file for complete search history.

(56) References Cited

U.S. PATENT DOCUMENTS

| | | | |
|---|---|---|---|
| 2007/0089111 A1 | 4/2007 | Robinson et al. | |
| 2008/0134175 A1 | 6/2008 | Fitzgerald et al. | |
| 2008/0184225 A1* | 7/2008 | Fitzgerald et al. | 718/1 |
| 2008/0288962 A1 | 11/2008 | Greifeneder et al. | |
| 2009/0113109 A1 | 4/2009 | Nelson et al. | |
| 2009/0172662 A1 | 7/2009 | Liu | |
| 2009/0193245 A1 | 7/2009 | Isaacson | |
| 2009/0241194 A1 | 9/2009 | Thomas | |
| 2009/0328030 A1 | 12/2009 | Fries | |
| 2010/0107163 A1 | 4/2010 | Lee | |

OTHER PUBLICATIONS

Lagar-Cavilla et al. "SnowFlock: Rapid Virtual Machine Cloning for Cloud Computing" Apr. 2009, ACM.*
Ayad et al."Agent-based monitoring of Virtual Machines" Jun. 2010, IEEE.*
"Capability: Desktop, Device and Server Management", http://technet.microsoft.com/en-us/library/bb821280.aspx, accessed Jul. 23, 2010, 1-14.
Davis, "How to Convert Physical Machines to Virtual Machines with VMware Converter", http://www.petri.co.il/virtual_convert_physical_machines_to_virtual_machines_with_vmware_converter_2.htm, accessed Feb. 21, 2011, 1-6.
Holt et al., "Microsoft System Center Configuration Management Basics", http://www.informit.com/articles/article.aspx?p=1381875&seqNum=6#, accessed Jul. 23, 2010, 1-6.

* cited by examiner

Primary Examiner — Qing Wu
(74) Attorney, Agent, or Firm — Jim Sfekas; Kate Drakos; Micky Minhas

(57) ABSTRACT

An invention is disclosed for configuring a VM of a deployment to be managed by a management system. In an embodiment, a deployment manager of a deployment instructs a host to create a VM. The VM is created with a base management agent that exposes interfaces to the deployment manager that enable the deployment manager to install management agents on the VM. The deployment manager installs a management agent that corresponds to a management system on the VM, and registers the VM with the management system. The management system may then manage the VM by communicating with the installed management agent on the VM.

20 Claims, 8 Drawing Sheets

INSERTION OF MANAGEMENT AGENTS DURING MACHINE DEPLOYMENT

BACKGROUND

There are collections of multiple computers, commonly referred to as data centers, server farms, or deployments. It is common in these deployments to have one or more management systems that monitor and manage multiple computers (either physical computers or virtual machines (VMs)) in a deployment. For instance, a management system may manage patching the computers, standing up a computer—including installing applications on the computer, and instantiating those applications (such as a MICROSOFT Server App-V application virtualization package, or a MICROSOFT Database Application Components description of a database)—or monitoring the health of the computers. Such a management system may manage a computer by interacting with a corresponding management agent on the computer.

Furthermore, it is common for multiple computers of a deployment to be homogenously configured. Computers may be homogenously configured, for instance, where they are configured to execute the same version of an operating system, or they are configured to execute the same versions of applications.

One way that administrators configure computers to be managed by management programs is as follows. An administrator orders the computers, receives them, mounts them in racks, installs program code on each from a disc, and then registers each computer with one or more management systems that will manage the computer. Apart from some of the details involving the physical machines themselves, an administrator may configure the VMs in a deployment to be managed by management programs in a similar way. There are many problems with these known techniques for configuring VMs in a deployment to be managed by management programs, some of which are well known.

SUMMARY

It would therefore be an improvement for configuring VMs of a deployment to be managed by management programs.

Including a management agent in an operating system gold image may be desirable (sometimes referred to as baking the management agent into the gold image), but baking the agent in carries with it problems. There may be many management agents, and anytime any agent changes, a new gold image needs to be created, which takes work by an administrator. Additionally, some management agents are not designed to be baked in. To be baked in successfully, a management agent needs to be able to survive being generalized (most gold images do not contain machine-specific information, like a machine name, or an IP address of the machine), and/or a system preparation process (such as MICROSOFT Sysprep). A management agent may not survive either of these processes, for instance, because it relies on information changed by one of these processes to be known and consistent.

Furthermore, it may be that a management agent cannot be configured remotely, because the agent lacks exposed interfaces that enable a remote system to configure the agent. So, where an administrator may stand up dozens or hundreds of VMs in a few minutes, he or she would still have to go in and manually configure each one of those VMs with the management agent. Even where a management agent does have exposed interfaces that allow for remote configuration, doing so may take an unacceptably long amount of time. It is typical to address computers using the Domain Name System (DNS). However, once a computer is brought online and registered with DNS, it may take several minutes for the DNS registration to propagate through a communications network so that the computer can be remotely addressed via DNS. This time required for a DNS name to propagate may be unacceptably long.

Therefore, it may be advantageous to install a management program in a VM separate from imaging the VM with a gold image. In an embodiment, a deployment has a deployment manager that is configured to create, destroy and manage VMs on hosts in the deployment. An example of such a deployment manager is MICROSOFT's System Center Virtual Machine Manager (SCVMM). The deployment manager determines that a VM is to be created on a host, and instructs that host to create a VM. When the deployment manager receives and indication that the VM has been created, the deployment manager instructs the VM to install a management agent or management program, that a management system may communicate with to manage the VM. The management agent provided functionality for the management system to manage the computer. For instance, the management agent may expose interfaces that allow the management system to communicate with the management agent, and the management agent may carry out on the computer actions to effectuate the instructions of the management system. The deployment manager also registers the VM with the management system. The management system may then manage the VM by communicating with the management agent on the VM.

Other embodiments of an invention for configuring VMs of a deployment to be managed by management programs, exist, and some examples of such are described with respect to the detailed description of the drawings.

BRIEF DESCRIPTION OF THE DRAWINGS

The systems, methods, and computer-readable media for configuring a VM of a deployment to be managed by a management system are further described with reference to the accompanying drawings in which.

DETAILED DESCRIPTION OF ILLUSTRATIVE EMBODIMENTS

Figure 1:
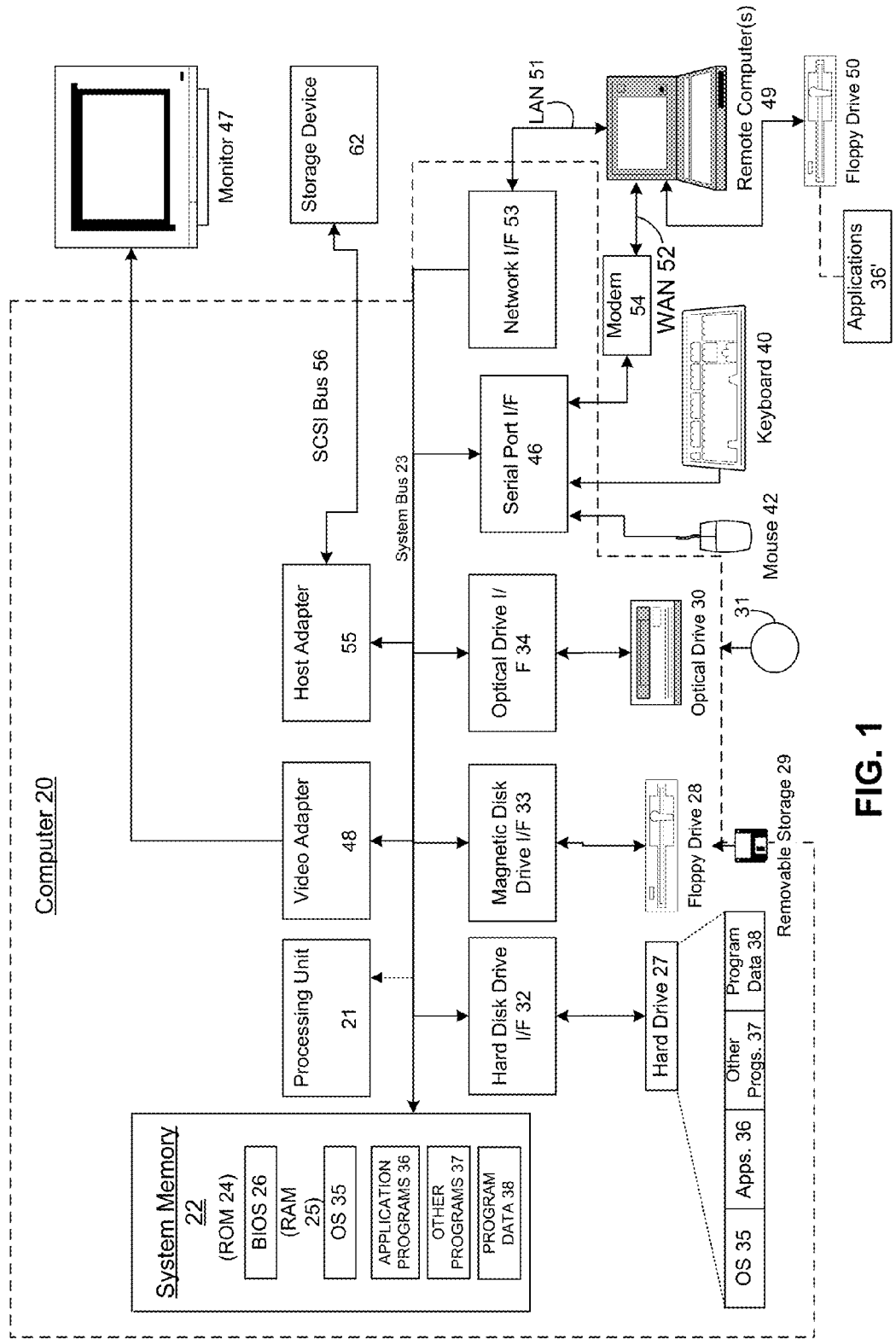
FIG. 1 depicts an example general purpose computing environment in which an aspect of an embodiment of the invention can be implemented.

Embodiments may execute on one or more computer systems. FIG. 1 and the following discussion are intended to provide a brief general description of a suitable computing environment in which the disclosed subject matter may be implemented.

The term processor used throughout the description can include hardware components such as hardware interrupt controllers, network adaptors, graphics processors, hardware based video/audio codecs, and the firmware used to operate such hardware. The term processor can also include microprocessors, application specific integrated circuits, and/or one or more logical processors, e.g., one or more cores of a multi-core general processing unit configured by instructions read from firmware and/or software. Logical processor(s) can be configured by instructions embodying logic operable to perform function(s) that are loaded from memory, e.g., RAM, ROM, firmware, and/or mass storage.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as flash memory cards, digital video disks, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47, display or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 8:
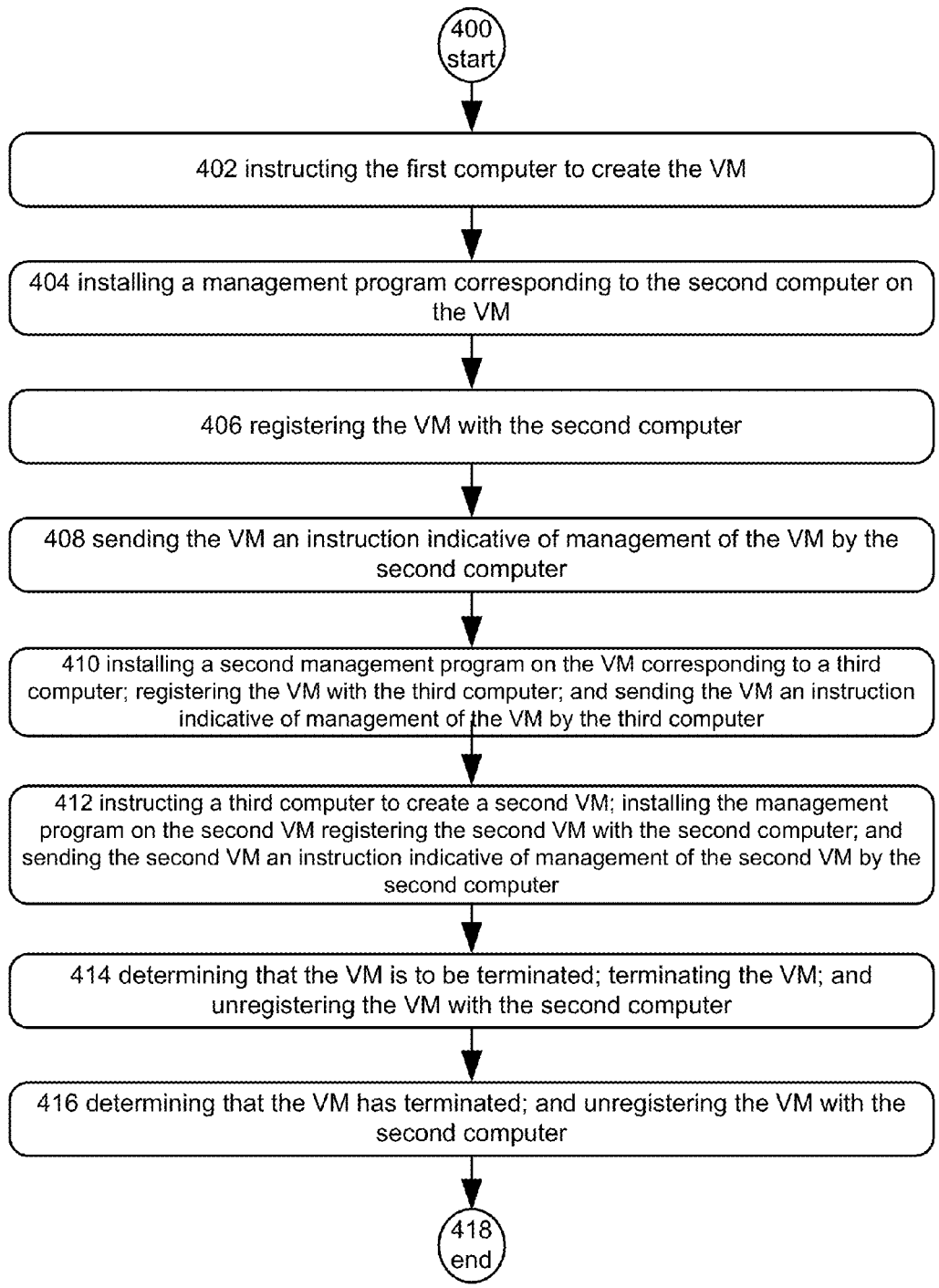
FIG. 8 depicts example operational procedures for a system that configures a VM of a deployment to be managed by a management system.

System memory 22 of computer 20 may comprise instructions that, upon execution by computer 20, cause the computer 20 to implement the invention, such as the operational procedures of FIG. 8.

Figure 2:
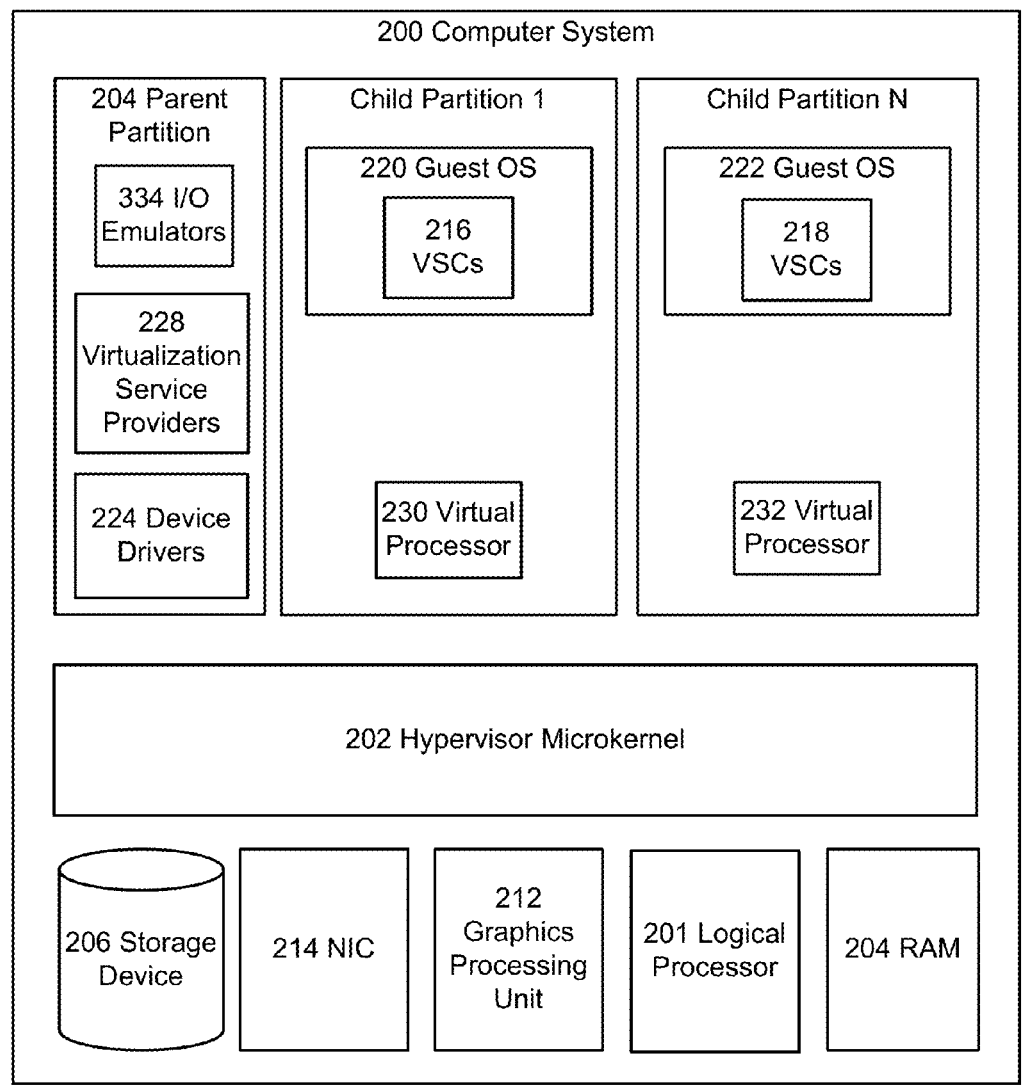
FIG. 2 depicts an example virtual machine host wherein an aspect of an embodiment of the invention can be implemented.

FIG. 2 depicts an example VMHost virtual machine host (sometimes referred to as a VMHost or host) wherein an aspect of an embodiment of the invention can be implemented. The VMHost can be implemented on a computer such as computer 20 depicted in FIG. 1, and VMs on the VMHost may execute an operating system that effectuates a remote presentation session server. As depicted, computer system 200 comprises logical processor 201 (an abstraction of one or more physical processors or processor cores, the processing resources of which are made available to applications of computer system 200), RAM 204, storage device 206, GPU 212, and NIC 214.

Hypervisor microkernel 202 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. In an embodiment, the GPAs and SPAs can be arranged into memory blocks, i.e., one or more pages of memory. When a guest writes to a block using its page table, the data is actually stored in a block with a different system address according to the system wide page table used by hypervisor.

In the depicted example, parent partition component 204, which can also be thought of as similar to "domain 0" in some hypervisor implementations, can interact with hypervisor microkernel 202 to provide a virtualization layer. Parent partition 204 in this operational environment can be configured to provide resources to guest operating systems executing in the child partitions 1-N by using virtualization service providers 228 (VSPs) that are sometimes referred to as "back-end drivers." Broadly, VSPs 228 can be used to multiplex the interfaces to the hardware resources by way of virtualization service clients (VSCs) (sometimes referred to as "front-end drivers") and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

Emulators 234 (e.g., virtualized integrated drive electronics device (IDE devices), virtualized video adaptors, virtualized NICs, etc.) can be configured to run within the parent partition 204 and are attached to resources available to guest operating systems 220 and 222. For example, when a guest OS touches a register of a virtual device or memory mapped to the virtual device 202, microkernel hypervisor can intercept the request and pass the values the guest attempted to write to an associated emulator.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processors execute hypervisor instructions. The combination of virtual processors and memory in a partition can be considered a virtual machine.

Guest operating systems can include any operating system such as, for example, a MICROSOFT WINDOWS operating system. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
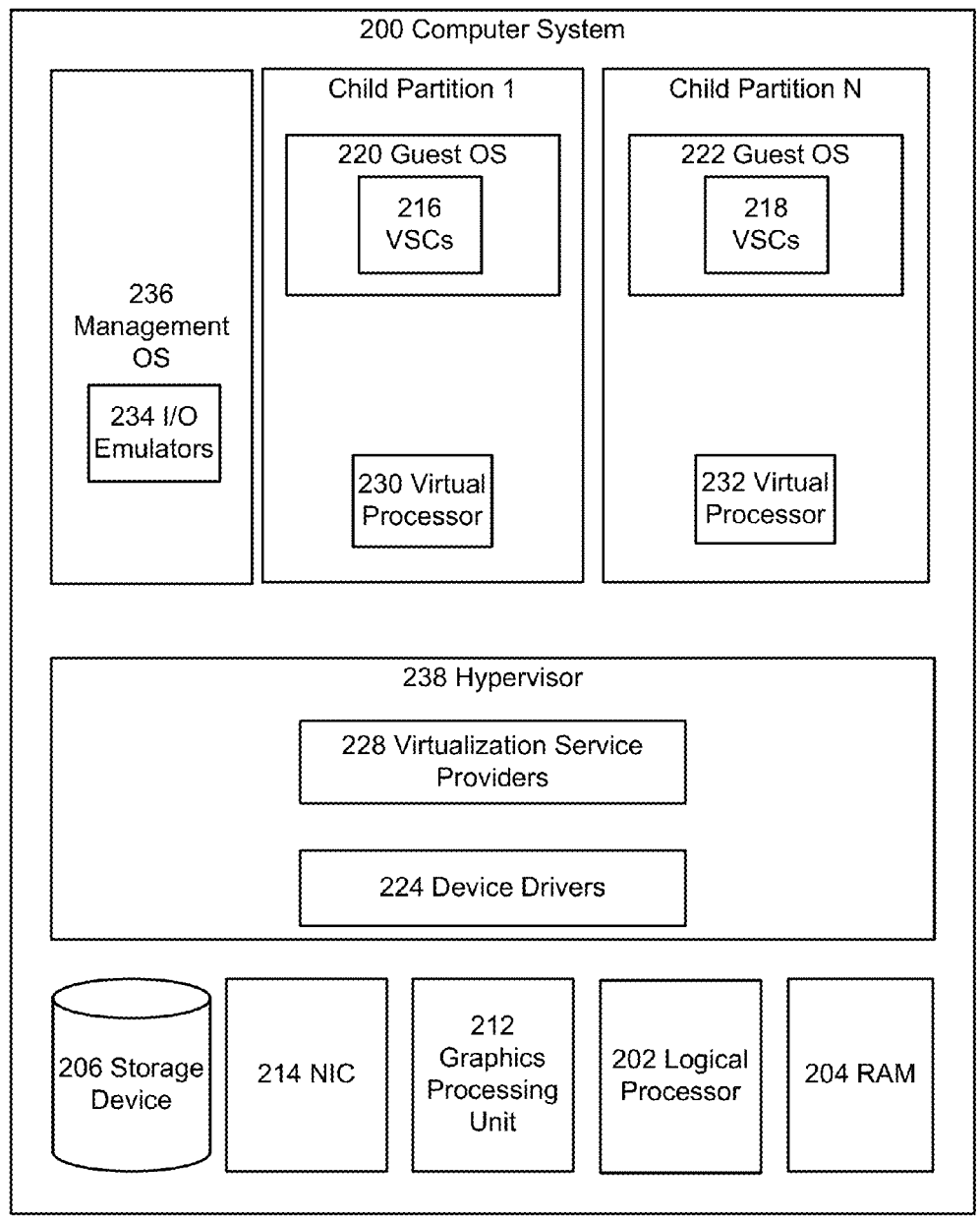
FIG. 3 depicts a second example virtual machine host wherein an aspect of an embodiment of the present invention can be implemented.

FIG. 3 depicts a second example VMHost wherein an aspect of an embodiment of the present invention can be implemented. FIG. 3 depicts similar components to those of FIG. 2; however in this example embodiment the hypervisor 238 can include the microkernel component and components from the parent partition 204 of FIG. 2 such as the virtualization service providers 228 and device drivers 224 while management operating system 236 may contain, for example, configuration utilities used to configure hypervisor 238. In this architecture hypervisor 238 can perform the same or similar functions as hypervisor microkernel 202 of FIG. 2; however, in this architecture hypervisor 238 can be configured to provide resources to guest operating systems executing in the child partitions. Hypervisor 238 of FIG. 3 can be a stand alone software product, a part of an operating system, embedded within firmware of the motherboard or a portion of hypervisor 238 can be effectuated by specialized integrated circuits.

Figure 4:
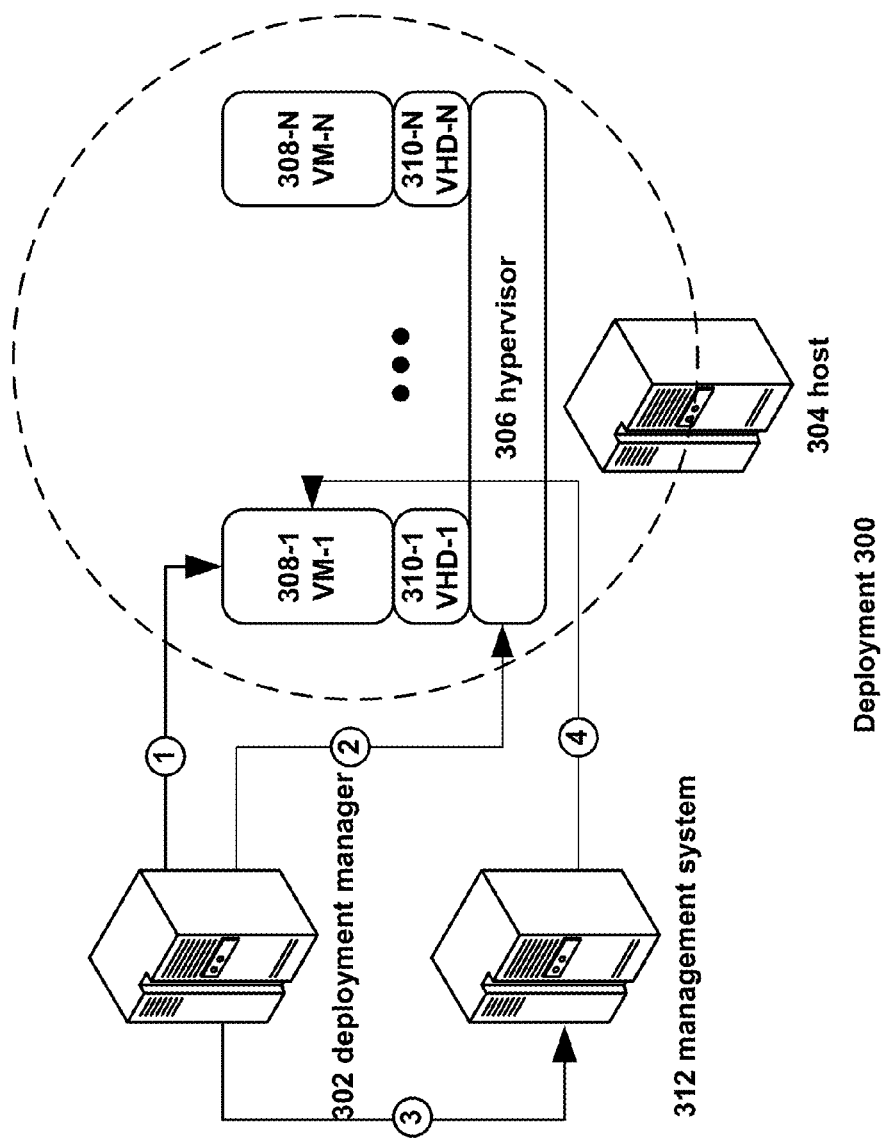
FIG. 4 depicts an example system architecture for configuring a VM of a deployment to be managed by a management system.

FIG. 4 depicts an example system architecture for configuring VMs of a deployment to be managed by a management system, such as VMs executing on the VMHost depicted in FIG. 2 or 3. Deployment 300 comprises deployment manager 302, host 304 and management system 312. In turn, host 304 comprises hypervisor 306, VM-1 308-1 through VM-N 308-N, and VHD-1 310-1 (virtual hard drive) through VHD-N 310-N.

Deployment manager 302 is configured to manage deployment 300. Among other functions, deployment manager may instruct a host 304 to create or destroy a VM 308, may provision a VM 308, may migrate a VM 308 between hosts 304 (as depicted, deployment 300 has one host 304, but it may comprise multiple hosts 304). As depicted in FIG. 4 and elsewhere, depicted elements (such as deployment manager 302 and management system 312) may execute on separate physical computers, or share a physical computer with another depicted element—such as each executing in separate VMs on the physical computer, or even within the same VM on the physical computer.

Host 304 may comprise more or fewer than two VMs 308, though two are depicted. Likewise, host 304 may comprise more or fewer than two VHDs 310, though two are depicted. As depicted, each VHD 310 is associated with a VM 308—the VM 308 mounts the VHD 310 and may both read data from it and write data to it. A VM 308 may have more than one VHD 310 associated with it. Furthermore, a VHD 310 need not be stored on host 304, but may be stored elsewhere on a communication network, and associated with the VM 308 across the communication network. Host 304 also comprises hypervisor 306, which manages VMs 308, including presenting VMs with virtual hardware resources.

Management system 312 is configured to manage one or more aspects of one or more VMs 308. For instance, management system 312 may be configured to ensure that a VM 308 is properly updated by deploying patches to VM 308. Management system 312 may also be configured to manage the health of VM 308, such as by ensuring that it is running in an allowable state (including whether certain processes are running, certain files are present, or that there are no entries in an error log indicating that an error is present in a particular subsystem). Management system 312 may effectuate this management of a VM 308 by communicating with a management agent that executes on VM 308.

The following communication flow within deployment 300 may be used to effectuate configuring a VM of deployment 300 to be managed by management system 312. In communication (1), deployment manager 302 sends an instruction to hypervisor 306 to create VM-1 308-1. Hypervisor 306 may create VM-1 308-1 with various parameters (e.g., amount and type of central processing units, amount and type of system memory, number and type of storage devices), and then associate VHD-1 310-1 with VM 308-1, such that VM-1 308-1 mounts VHD 310-1. Deployment manager 302 may create VM-1 308-1 with an image file (sometimes referred to as a gold image, or a golden image) that comprises aspects of the VM-1 308-1, such as data for a guest operating system (guest OS).

Upon creation of VM-1 308-1, deployment manager 302 receives acknowledgement that VM-1 308-1 has been created. Hypervisor 306 may send deployment manager 302 an indication that it has successfully created VM-1 308-1, or VM-1 308-1 itself may communicate with deployment manager 302 to convey this information that it has been created. When deployment manager 302 has determined that VM-1 308-1 has been created, in communication (2), deployment manager 302 installs a management agent for management system 312. VM-1 308-1 may have been created with a base management agent—a process that executes within VM-1 308-1 that exposes an interface that enables deployment manager 302 to install other management agents on VM-1 308-1. Where this is the case, deployment manager 302 may instruct the base management agent on VM-1 308-1 to install a management agent for management system 312. Deployment manager 302 may, for instance, send VM-1 308-1 a copy of the management agent, send VM-1 308-1 a link to a location from where the management agent may be obtained, or direct VM-1 308-1 to a location in a file system of VM-1 308-1 where the management agent is installed. Once VM-1 308-1 has the management agent itself, VM-1 308-1 may undertake an installation procedure to install the management agent, so it is configured to communicate with management system 312. After the management agent has been installed, VM-1 308-1 may communicate this fact to deployment manager 302.

After deployment manager 302 determines that the management agent has been installed on VM-1 308-1, deployment manager 302 may communicate (3) with management system 312 to register the management agent with management system 312. This act of registration may include an indication to create an account or other entry for VM-1 308-1 on management system 312, and also an indication of how to reach the management agent of VM-1 308-1, such as an IP address of VM-1 308-1, and a port upon which the management agent listens.

After the management agent of VM-1 308-1 has been registered with management system 312, management system 312 may manage VM-1 308-1. In communication (4), management system 312 performs such management of VM-1 308-1. For instance, communication (4) may comprise management system 312 sending the management agent of VM-1 308-1 an indication of an operating system patch that the management agent is to use to patch a guest operating system of VM-1 308-1.

It may be appreciated that there may be additional communication flows in the process of configuring VMs of a deployment to be managed by a management system. For instance, communication (1)—which here depicts deployment manager 302 instructing hypervisor 306 to create VM-1 308-1—may involve more communications than just the depicted communication (1) from deployment manager 302 to hypervisor 306. This communication flow may include multiple communications from deployment manager 302 to hypervisor 306 and one or more communications from hypervisor 306 to deployment manager 302.

Figure 5:
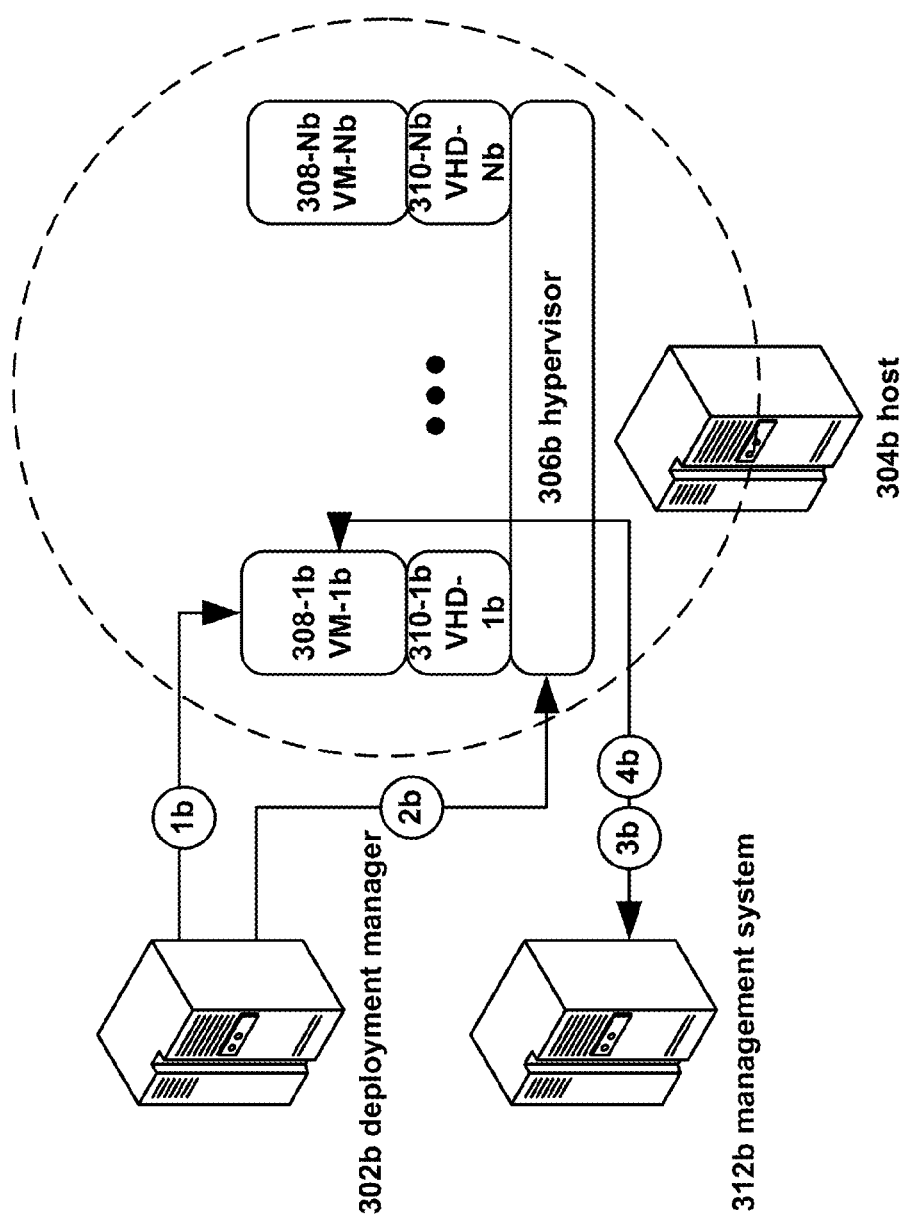
FIG. 5 depicts another example system architecture for configuring a VM of a deployment to be managed by a management system.

FIG. 5 depicts another example system architecture for configuring a VM of a deployment to be managed by a management system, in addition to the example system architecture depicted in FIG. 4. Deployment 300b, deployment manager 302b, host 304b, hypervisor 306b, VMs 308-1b through 308-Nb, VHDs 310-1b through 310-1Nb, and management system 312b may be similar to deployment 300, deployment manager 302, host 304, hypervisor 306, VMs 308-1 through 308-N, VHDs 310-1 through 310-1N, and management system 312, respectively, of FIG. 4. Additionally, communication flows (1b), (2b), and (4b) may be similar to communication flows (1), (2), and (4), respectively, of FIG. 4.

The primary difference between FIGS. 4 and 5 is in how the management agent of VM-1 308-1 and VM-1b 308-1b register with respective management systems 312 and 312b. In FIG. 4, deployment manager 302 determines that VM-1 308-1 has installed the management agent, and then registers VM-1 308-1 with management system 312 in communication (3). Registering the management agent with management system 312 as in the embodiment of FIG. 4 may be preferable where deployment manager 302 also un-registers VMs 308 from management system 312, because then the acts of registering and un-registering are similar—both involve a communication from deployment manager 302 to management system 312.

In contrast, the communication (3b) of FIG. 5, where the management agent of VM-1b 308-1b contacts may also be preferable under certain circumstances. For instance, this may reduce the processing resources required by deployment manager 302, since deployment manager may have less work to do, and may simply the communication flow, since communication (3b) is sent directly from VM-1b 308-1b to management server 312, as opposed to through deployment manager 302b, as takes place in FIG. 4.

Figure 6:
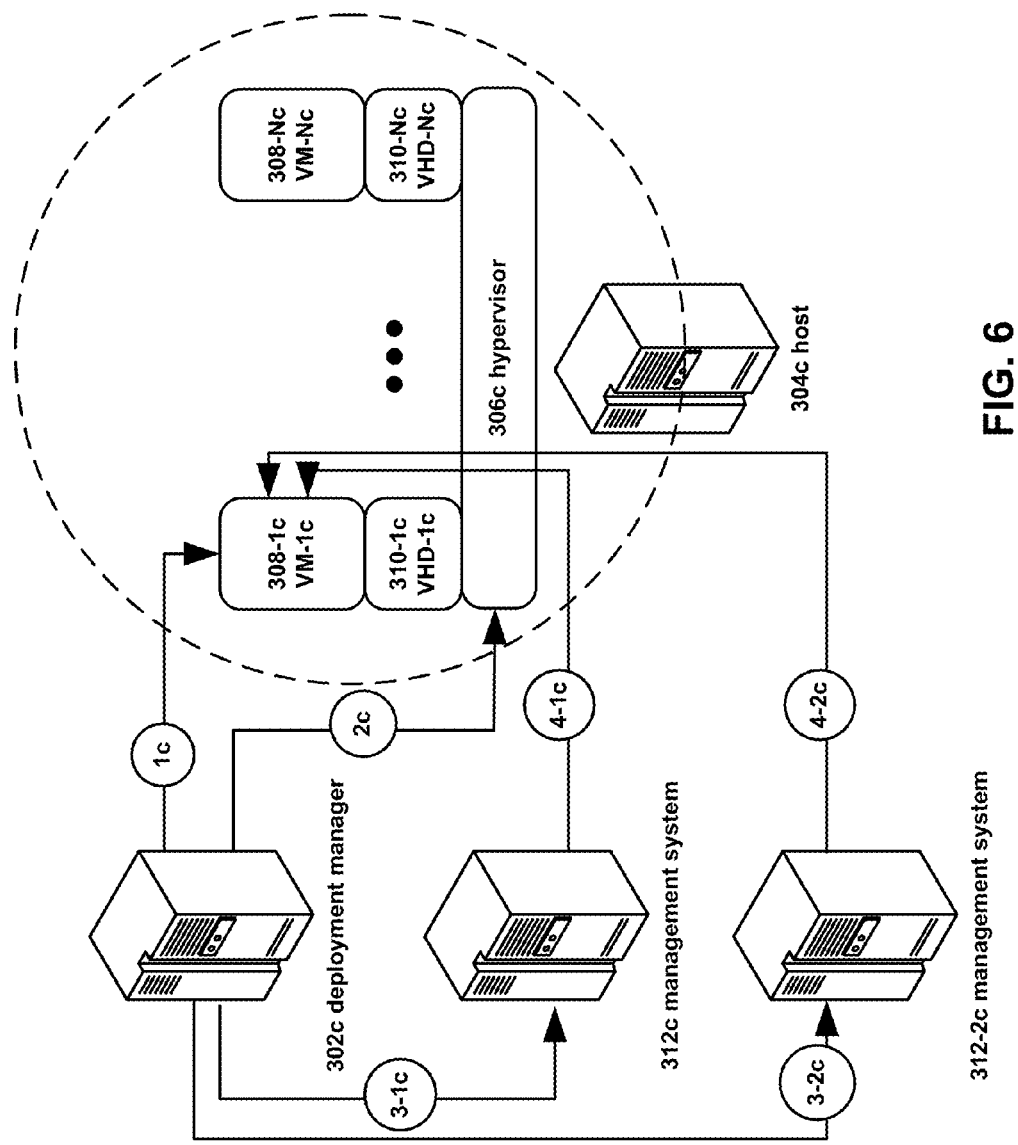
FIG. 6 depicts an example system architecture for configuring a VM of a deployment to be managed by multiple management systems.

FIG. 6 depicts an example system architecture for configuring a VM of a deployment to be managed by multiple management system, in addition to the system architectures depicted in FIGS. 4 and 5.

Deployment 300c, deployment manager 302c, host 304c, hypervisor 306c, VMs 308-1c through 308-Nc, VHDs 310-1c through 310-1Nc, and management system 312c may be similar to deployment 300, deployment manager 302, host 304, hypervisor 306, VMs 308-1 through 308-N, VHDs 310-1 through 310-1N, and management system 312, respectively, of FIG. 4. Also depicted is management server 312-2c, which is similar to management server 312c, though may be responsible for a different type of management (for instance, management system 312c may be responsible for managing patching of VMs 308, while management system 312-2c may be responsible for managing the health of VMs 308).

Additionally, communication flows (1c) and (2c) may be similar to communication flows (1) and (2), respectively of FIG. 4. Communication flows (3c-1) and (3c-2) may each be similar to communication flow (3) of FIG. 4, and communication flows (4c-1) and (4c-2) may each be similar to communication flow (3) of FIG. 4.

FIG. 6 shows how multiple management systems 312c may be used to manage a single VM 308. In FIG. 6, communication flow (2c) comprises installing two management agents on VM-1c 308-1c—one management agent for management server 312c, and a second management agent for management server 312-2c. After deployment manager 302c has determined that the management agent corresponding to management system 312c has been installed on VM-1c 308-1c, deployment manager 302c makes communication (3-1c) to management server 312c to register VM-1c 308-1c with management server 312c. Likewise, after deployment manager 302c has determined that the management agent corresponding to management system 312-2c has been installed on VM-1c 308-1c, deployment manager 302c makes communication (3-2c) to management server 312-2c to register VM-1c 308-1c with management server 312-2c.

When VM-1c 308-1c has been registered with each respective management system 312, that management system 312 may then manage VM-1c 308-1c. Management system 312c manages VM-1c 308-1c by communicating with VM-1c 308-1c in communication (4-1c), and management system 312-2c manages VM-1c 308-1c by communicating with VM-1c 308-1c in communication (4-2c).

Figure 7:
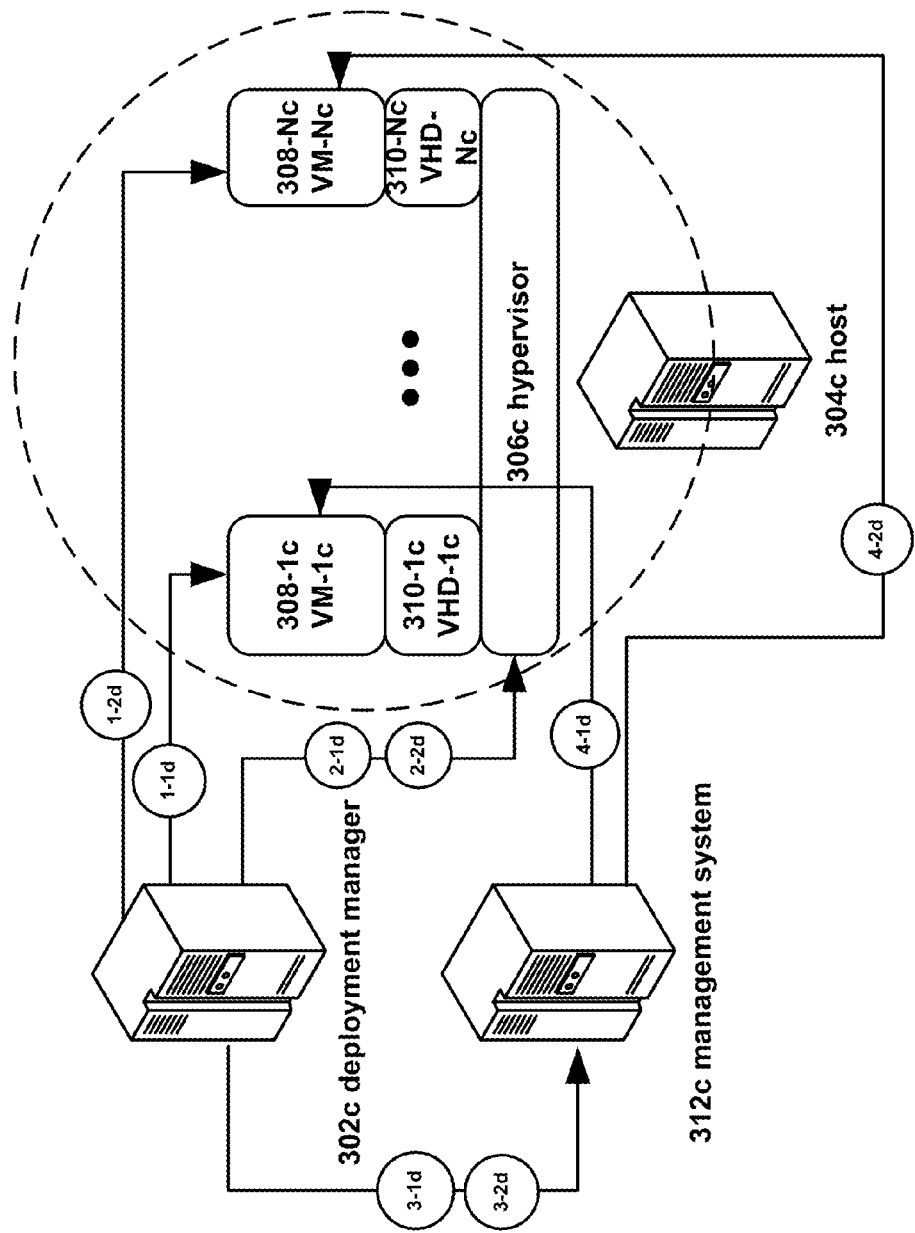
FIG. 7 depicts an example system architecture for configuring multiple VMs of a deployment to be managed by a management system.

FIG. 7 depicts an example system architecture for configuring multiple VMs of a deployment to be managed by a management system, in addition to the system architectures depicted in FIGS. 4-6.

Deployment 300d, deployment manager 302d, host 304d, hypervisor 306d, VMs 308-1d through 308-Nd, VHDs 310-1d through 310-1Nd, and management system 312d may be similar to deployment 300, deployment manager 302, host 304, hypervisor 306, VMs 308-1 through 308-N, VHDs 310-1 through 310-1N, and management system 312, respectively, of FIG. 4. Similarly, each of communications (1-1d) and (1-2d) may be similar to communication (1) of FIG. 4; each of communications (2-1d) and (2-2d) may be similar to communication (2) of FIG. 4; each of communications (3-1d) and (3-2d) may be similar to communication (3) of FIG. 4; and each of communications (4-1d) and (4-2d) may be similar to communication (4) of FIG. 4.

It may be appreciated that multiple VMs—depicted herein as VM-1d 308-1d and VM-Nd 308-Nd—may be registered with a single management system 312d, and that single management system 312d may manage each of those VMs 308-1d and 308-Nd. Management system 312d may send these VMs 308 roughly similar management instructions. This may occur, for instance, where each VM 308 has the same version of a guest OS, so when management system 312d manages the VMs 308 by patching them, management system 312d instructs each VM 308 to install the same patch. Management system 312d may also send these VMs 308 management instructions that vary somewhat. This may occur, for instance, where management system 312d is managing the health of VMs 308. Where VM-1d 308-1d is in a healthy state, and VM-Nd 308-Nd is in an unhealthy state, management system 312d may send to VM-Nd 308-Nd instructions related to diagnosing why VM-Nd 308-Nd is in an unhealthy state. Management system 312d may not send these instructions to VM-1d 308-1d because VM-1d 308-1d is in a healthy state.

FIG. 8 depicts example operational procedures for a system that configures a VM of a deployment to be managed by a management system. These operational procedures may be implemented in deployment manager 302 of FIGS. 4-7 to implement the present invention The operational procedures begin with operation 400, which leads into operation 402. Operation 402 depicts instructing the first computer to create the VM. This operation may be performed by a deployment manager, such as deployment manager 302 of FIG. 4, and may be similar to communication (1) of FIG. 4, where the deployment manager 302 sends an instruction to the hypervisor 306 of a host 304 to create a new VM—VM-1 308-1.

Operation 404 depicts installing a management program corresponding to the second computer on the VM. Operation 404 may be performed by a deployment manager that issues such an instruction to the VM, such as deployment manager 302 of FIG. 4. Operation 404 may be similar to communication (2) of FIG. 4, where the deployment manager sends an instruction to VM-1 308-1 to install a management agent upon VM-1 308-1 that corresponds to management system 312.

The base management agent may expose an interface such as a MICROSOFT Windows Management Interface (WMI) interface. The deployment manager may instruct the base management agent through making a call to the exposed interface of the VM to download or otherwise obtain files for a management agent that corresponds to the management system to a location in a file system of the VM (such as ADMIN$ in versions of the MICROSOFT WINDOWS operating system). The deployment manager may also make an interface call to have the base management agent instruct an installer program (such as MICROSOFT Installer Package (MSI)) to install the management agent for the management system.

Operation 404 may also comprise copying the management program to a virtual hard drive (VHD) mounted by the VM. A way to install the management agent corresponding to the management system on the VM is to store the management agent on a virtual hard disk (VHD) or other disk, and have the VM mount the VHD, and run an installer program for the management agent. This may be effectuated such as through an xcopy (extended copy) command.

Operation 404 may also comprise instructing the VM to mount an image file that stores the management program, the mounted image file being presented to the VM as removable media. For instance, the deployment manager may store the management agent in an image file (such as an ISO image), and then instructing the VM to mount the image file as, for instance, a DVD disc, and install the management agent from that mounted image file.

In an embodiment where operation 404 comprises instructing the VM to install a management program corresponding to the second computer is performed by a third computer—such as deployment manager 302—operation 406 comprises: sending, by the third computer, to the second computer, a message indicative of registration of the VM.

In an embodiment where the operational procedures of FIG. 8 include sending the VM configuration information for the management program, operation 404 comprises: instructing the VM to configure the management program based on the configuration information. The configuration information may comprise information identifying the second computer, such as an IP address of the second computer. The information may also comprise a security secret used by the VM to communicate with the second computer (such as to register the VM with the second computer, as depicted in operation 406). The VM may use the security secret as proof to the second computer (which did not create the VM, and may not be aware of the VM prior to this act of registration) that the VM should be registered with the second computer, rather than being, for instance, a malicious entity attempting to masquerade as an appropriate entity. The secret may, for instance, be a certificate issued by an authority trusted by the management system. Where both the VM and the second computer possess the security secret, the VM may use the security secret as the input to a mathematical function, and send the result to the second computer. The second computer may also use the security secret as the input to the same mathematical function, and compare the result it determines against the result received from the VM. Where the second computer determines that the results match, it may determine that the VM possesses the security secret, and therefore, may be registered with the second computer.

Operation 406 depicts registering the VM with the second computer, such as management system 312 of FIG. 4. This act of registration may be performed directly from the VM to the second computer—in an embodiment, operation 406 comprises sending, by the VM, to the second computer, a message indicative of registration of the VM. This act of registration may be performed be an entity other than the VM—such as the deployment manager 302 of FIG. 4—in an embodiment where operation 404 is performed by a third computer, operation 406 comprises: sending, by the third computer, to the second computer, a message indicative of registration of the VM. Operation 406 may be performed in a manner similar to communication flow (3) of FIG. 4.

Operation 408 depicts sending the VM an instruction indicative of management of the VM by the second computer. Operation 408 may be performed in a manner similar to communication flow (4) of FIG. 4. For instance, where the second computer is responsible for patch management, operation 408 may comprise the second computer sending the VM an instruction to download and install an operating system patch for a guest OS of the VM. The VM may initiate the management process. For instance, the agent may query the management system for a manifest of required patches for the VM, then check the VM to see whether the required patches are installed. If not, the agent may download and install those patches.

Operation 410 depicts installing a second management program on the VM corresponding to a third computer—such as management system 312-2c of FIG. 6; registering the VM with the third computer; and sending the VM an instruction indicative of management of the VM by the third computer. A single VM may be managed by multiple management systems 312, and VM 312 may have a separate management agent executing within it that corresponds to each management system 312. Thus, the second computer and third computer may each have the VM registered to them, and may each manage the VM.

Operation 412 depicts instructing a third computer—such as another instance of VM host 304 of FIG. 4 to create a second VM; installing the management program on the second VM; and sending the second VM an instruction indicative of management of the second VM by the second computer. One management system 312 may manage multiple VMs, even VMs that execute on different hosts. Each of those VMs under management may be registered to management system 312, and management system 312 may send each management instructions, similar to communication flows (4-1d) and (4-2d) of FIG. 7.

Operation 414 depicts determining that the VM is to be terminated; terminating the VM; and unregistering the VM with the second computer. Deployment manager 302 of FIG. 4 may control the act of terminating VMs. There may be times where a VM may be terminated or otherwise shut down in an orderly fashion, such as where the deployment manager 302 determines that a VM has skewed too far from a known state. In such a scenario, deployment manager 302 of FIG. 4 may determine to terminate the VM, and take actions to effectuate this. The deployment manager 302 may also unregister the VM from the management system 312, so that management system 312 does not keep attempting to manage a VM that is no longer executing.

Operation 416 depicts determining that the VM has terminated; and unregistering the VM with the second computer. The VM may also terminate unexpectedly—such as where there is a hardware failure of the host upon which it executes (like host 304 of FIG. 4) that causes the host, and all VMs executing on it, to shut down. An entity, such as deployment manager 302 of FIG. 4, may monitor the running status VMs of a deployment, and where it determines that a VM has terminated, notify the second computer of this to unregister it.

The operational procedures conclude with operation 418. It may be appreciated that not all operational procedures need be present in every embodiment of the invention. For instance, an embodiment of the invention may implement operations 400, 402, 404, 406, 408, and 418, where a VM is created, a management program is installed on the VM, the VM is registered with a management system, and the management system sends an instruction to the VM indicative of management of the VM.

CONCLUSION

While the present invention has been described in connection with the preferred aspects, as illustrated in the various figures, it is understood that other similar aspects may be used or modifications and additions may be made to the described aspects for performing the same function of the present invention without deviating there from. Therefore, the present invention should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for configuring a virtual machine (VM) of a first computer to be managed by a second computer, comprising:
   instructing, by a computer, the first computer to create the VM;
   after the first computer has created the VM, installing, by the computer, a management program on the VM corresponding to the second computer; and
   registering, by the computer, the VM with the second computer, the second computer sending the VM an instruction indicative of management of the VM by the second computer, the second computer sending to the VM independent of the computer.

2. The method of claim 1, further comprising:
   instructing the VM to install a second management program corresponding to a third computer; and
   registering the VM with the third computer, the third computer sending the VM an instruction indicative of management of the VM by the third computer.

3. The method of claim 1, further comprising;
   instructing a third computer to create a second VM;
   installing the management program on the second VM; and
   registering the second VM with the second computer, the second computer sending the second VM an instruction indicative of management of the second VM by the second computer.

4. The method of claim 1, further comprising:
   determining that the VM is to be terminated;
   terminating the VM; and
   unregistering the VM with the second computer.

5. The method of claim 1, further comprising:
   determining that the VM has terminated; and
   unregistering the VM with the second computer.

6. The method of claim 1, wherein registering the VM with the second computer comprises:

sending, by the VM, to the second computer, a message indicative of registration of the VM.

7. The method of claim 1, wherein instructing the VM to install a management program corresponding to the second computer is performed by a third computer, and wherein registering the VM with the second computer comprises:
sending, by the third computer, to the second computer, a message indicative of registration of the VM.

8. The method of claim 2, further comprising:
sending configuration information for the management program to the VM; and
wherein instructing the VM to install the second management program corresponding to the third computer comprises:
instructing the VM to configure the second management program based on the configuration information.

9. The method of claim 8, wherein the configuration information comprises:
information identifying the second computer.

10. The method of claim 8, wherein the configuration information comprises:
a security secret used by the VM to communicate with the second computer.

11. A system for configuring a virtual machine (VM) of a deployment to be managed by a management system comprising:
at least one processor; and
at least one memory communicatively coupled to the at least one processor when the system is operational, the at least one memory bearing instructions that, upon execution by the at least one processor, cause the system at least to:
instruct a first computer, by a second computer of the deployment, to create the VM;
after the first computer has created the VM, instruct the VM, by the second computer, to install a management program corresponding to a third computer;
register the VM with the third computer; and
send the VM, by the third computer, an instruction indicative of management of the VM by the third computer, the third computer sending to the VM independent of the computer.

12. The system of claim 11, wherein the instructions that, upon execution by the at least one processor cause the system at least to instruct the VM to install a management program corresponding to the third computer further cause the system at least to:
copy the management program to a virtual hard drive (VHD) mounted by the VM.

13. The system of claim 11, wherein the instructions that, upon execution by the at least one processor cause the system at least to instruct the VM to install a management program corresponding to the third computer further cause the system at least to:
make a call to an exposed interface of the VM.

14. The system of claim 11, wherein the instructions that, upon execution by the at least one processor cause the system at least to instruct the VM to install a management program corresponding to the third computer further cause the system at least to:
instruct the VM to mount an image file that stores the management program, the mounted image file being presented to the VM as removable media.

15. The system of claim 11, wherein the at least one memory further bears instructions that, upon execution by the at least one processor, cause the system at least to:
instruct the VM, by the second computer to install a second management program corresponding to a fourth computer;
register the VM with the fourth computer; and
send the VM, by the fourth computer, an instruction indicative of management of the VM by the fourth computer.

16. The system of claim 11, wherein the at least one memory further bears instructions that, upon execution by the at least one processor, cause the system at least to:
instructing a fourth computer, by the second computer, to create a second VM;
instruct the second VM, by the second computer, to install the management program;
register the second VM with the third computer; and
send the second VM, by the third computer, an instruction indicative of management of the second VM by the third computer.

17. The system of claim 11, wherein the at least one memory further bears instructions that, upon execution by the at least one processor, cause the system at least to:
determine, by the second computer, that the VM is to be terminated;
terminate, by the second computer, the VM; and
unregister, by the second computer, the VM with the third computer.

18. The system of claim 11, wherein the at least one memory further bears instructions that, upon execution by the at least one processor, cause the system at least to:
determine, by the second computer, that the VM has terminated; and
unregister, by the second computer, the VM with the third computer.

19. The system of claim 11, wherein the instructions that, upon execution by the at least one processor cause the system at least to register the VM with the third computer further cause the system at least to:
send, by the VM, to the third computer, a message indicative of registration of the VM.

20. A computer-readable storage device, excluding signals, bearing computer-readable instructions that, upon execution by a computer, cause the computer to perform operations comprising:
instructing a first computer, by a second computer of a deployment, to create a VM;
after the first computer has created the VM, instructing the VM, by the second computer, to install a management program corresponding to a third computer;
registering the VM, by the first computer, with the third computer; and
sending the VM, by the third computer, an instruction indicative of management of the VM by the third computer, the third computer sending to the VM independent of the first computer.

* * * * *